United States Patent
Ozaki et al.

(10) Patent No.: US 12,502,450 B2
(45) Date of Patent: Dec. 23, 2025

(54) ENDOSCOPE, ENDOSCOPE SYSTEM, AND OPERATION METHOD OF ENDOSCOPE SYSTEM

(71) Applicant: OLYMPUS MEDICAL SYSTEMS CORP., Tokyo (JP)

(72) Inventors: Akira Ozaki, Hachioji (JP); Takuya Toyooka, Hachioji (JP); Keita Ozawa, Hino (JP)

(73) Assignee: Olympus Medical Systems Corp., Tokyo (JP)

(*) Notice: Subject to any disclaimer, the term of this patent is extended or adjusted under 35 U.S.C. 154(b) by 416 days.

(21) Appl. No.: 18/088,844

(22) Filed: Dec. 27, 2022

(65) Prior Publication Data
US 2023/0226239 A1      Jul. 20, 2023

Related U.S. Application Data

(60) Provisional application No. 63/300,561, filed on Jan. 18, 2022.

(51) Int. Cl.
*A61B 1/00* (2006.01)
*A61B 1/018* (2006.01)
(Continued)

(52) U.S. Cl.
CPC ............ *A61L 2/26* (2013.01); *A61B 1/00098* (2013.01); *A61B 1/018* (2013.01); *A61B 1/045* (2013.01);
(Continued)

(58) Field of Classification Search
CPC ... A61L 2/26; A61L 2/04; A61L 2/088; A61L 2/10; A61L 2202/11; A61L 2202/24;
(Continued)

(56) References Cited

U.S. PATENT DOCUMENTS

| | | | |
|---|---|---|---|
| 2007/0276185 A1* | 11/2007 | Gono | A61B 5/0261 600/156 |
| 2010/0016671 A1* | 1/2010 | Wieters | A61B 1/00097 600/169 |

(Continued)

FOREIGN PATENT DOCUMENTS

| | | |
|---|---|---|
| JP | H10-262910 A | 10/1998 |
| JP | 2000-139838 A | 5/2000 |

(Continued)

*Primary Examiner* — Anh Tuan T Nguyen
*Assistant Examiner* — James Edward Boice
(74) *Attorney, Agent, or Firm* — Morgan, Lewis & Bockius LLP

(57) ABSTRACT

An endoscope includes an insertion section, a channel, a raising base and a sterilizing device. The insertion section includes a distal end portion, and the distal end portion includes a recess. The channel is disposed in the insertion section, the channel communicating with the recess and the channel configured to receive a treatment instrument. The raising base is disposed in the recess, the raising base configured to guide the treatment instrument to protrude from the recess. The sterilizing device is disposed in the distal end portion, the sterilizing device configured to sterilize one or more of the channel and the recess and the raising base.

14 Claims, 7 Drawing Sheets

(51) Int. Cl.
*A61B 1/045* (2006.01)
*A61B 1/05* (2006.01)
*A61B 1/12* (2006.01)
*A61L 2/04* (2006.01)
*A61L 2/08* (2006.01)
*A61L 2/10* (2006.01)
*A61L 2/26* (2006.01)

(52) U.S. Cl.
CPC .............. *A61B 1/05* (2013.01); *A61B 1/121* (2013.01); *A61L 2/04* (2013.01); *A61L 2/088* (2013.01); *A61L 2/10* (2013.01); *A61L 2202/11* (2013.01); *A61L 2202/24* (2013.01)

(58) Field of Classification Search
CPC ..... A61B 1/00098; A61B 1/018; A61B 1/045; A61B 1/05; A61B 1/121; A61B 1/00096; A61B 17/00; A61B 2018/00047; A61B 2018/00005; A61B 2018/087; A61B 2017/00097; A61B 18/22
USPC ............ 600/107, 104; 604/264; 606/29
See application file for complete search history.

(56) References Cited

U.S. PATENT DOCUMENTS

| | | | | |
|---|---|---|---|---|
| 2010/0192937 | A1* | 8/2010 | Vacca | F23C 13/00 |
| | | | | 126/263.01 |
| 2010/0317948 | A1* | 12/2010 | DiMauro | A61L 27/427 |
| | | | | 600/342 |
| 2011/0237886 | A1* | 9/2011 | Yamamoto | A61B 1/05 |
| | | | | 600/109 |
| 2018/0193498 | A1* | 7/2018 | Fritchie | H05B 6/14 |
| 2018/0318459 | A1* | 11/2018 | Hancock | A61L 2/03 |
| 2021/0169308 | A1* | 6/2021 | Fukuzawa | A61B 1/0623 |
| 2021/0244840 | A1* | 8/2021 | Mermel | A61L 2/10 |
| 2021/0338854 | A1* | 11/2021 | Nissenbaum | A61L 2/0047 |
| 2021/0361145 | A1* | 11/2021 | Harada | A61B 1/00098 |
| 2022/0071602 | A1* | 3/2022 | Kinomoto | A61B 1/00098 |
| 2023/0201390 | A1* | 6/2023 | Kim | H05H 1/2418 |
| | | | | 422/22 |

FOREIGN PATENT DOCUMENTS

| | | |
|---|---|---|
| JP | 2002-085347 A | 3/2002 |
| JP | 2009-201683 A | 9/2009 |

* cited by examiner

ENDOSCOPE, ENDOSCOPE SYSTEM, AND OPERATION METHOD OF ENDOSCOPE SYSTEM

RELATED APPLICATION DATA

This application is based on and claims priority under 35 U.S.C. § 119 to U.S. Provisional Application No. 63/300,561 filed on Jan. 18, 2022, the entire contents of which are incorporated herein by reference.

FIELD OF THE DISCLOSURE

The present disclosure relates to an endoscope in which a treatment instrument is inserted through an insertion section, an endoscope system including the endoscope in which the treatment instrument is inserted through the insertion section, and an operation method of the endoscope system including the endoscope in which the treatment instrument is inserted through the insertion section.

DESCRIPTION OF THE RELATED ART

To prevent contamination by bacteria at the time of re-use, an endoscope is subjected to disinfection/cleaning (reprocessing) after use. A single-use endoscope, also referred to as a disposable endoscope, is sealed in a package in a sterilized state and is taken out of the package immediately before use.

Japanese Patent Application Laid-Open Publication No. H10-262910 discloses an endoscope, a conduit of which is filled with a transparent liquid for ultraviolet propagation, where the conduit is sterilized by radiation of ultraviolet rays from an end portion.

Japanese Patent Application Laid-Open Publication No. 2002-85347 discloses an endoscope system that sterilizes fluid that flows through a conduit by a sterilization lamp.

Japanese Patent Application Laid-Open Publication No. 2000-139838 discloses an endoscope, a component surface of a raising base (forceps elevator) of which is coated with a photocatalyst portion with a photocatalytic effect.

SUMMARY OF THE DISCLOSURE

An endoscope includes an insertion section, a channel, a raising base and a sterilizing device. The insertion section includes a distal end portion, the distal end portion including a recess. The channel is disposed in the insertion section, the channel communicating with the recess and the channel configured to receive a treatment instrument. The raising base is disposed in the recess, the raising base configured to guide the treatment instrument to protrude from the recess. The sterilizing device is disposed in the distal end portion, the sterilizing device configured to sterilize one or more of the channel and the recess and the raising base.

An endoscope system includes an insertion section, a channel, a raising base, a sterilizing device and an image pickup unit. The insertion section includes a distal end portion, the distal end portion including a recess. The channel is disposed in the insertion section, the channel communicating with the recess and the channel configured to receive a treatment instrument. The raising base is disposed in the recess, the raising base configured to guide the treatment instrument to protrude from the recess. The sterilizing device is disposed in the distal end portion, the sterilizing device configured to sterilize one or more of the channel and the recess and the raising base. The image pickup unit is disposed on the distal end portion. An external device is configured to supply power to the sterilizing device. A method of operating the endoscope system includes driving the image pickup unit by the external device, and when the image pickup unit is driven by the external device, simultaneously driving the image pickup unit by the external device and supplying power from the external device to the sterilizing device to sterilize the one or more of the channel and the recess and the raising base.

DETAILED DESCRIPTION OF THE EMBODIMENTS

First Embodiment

Figure 1:
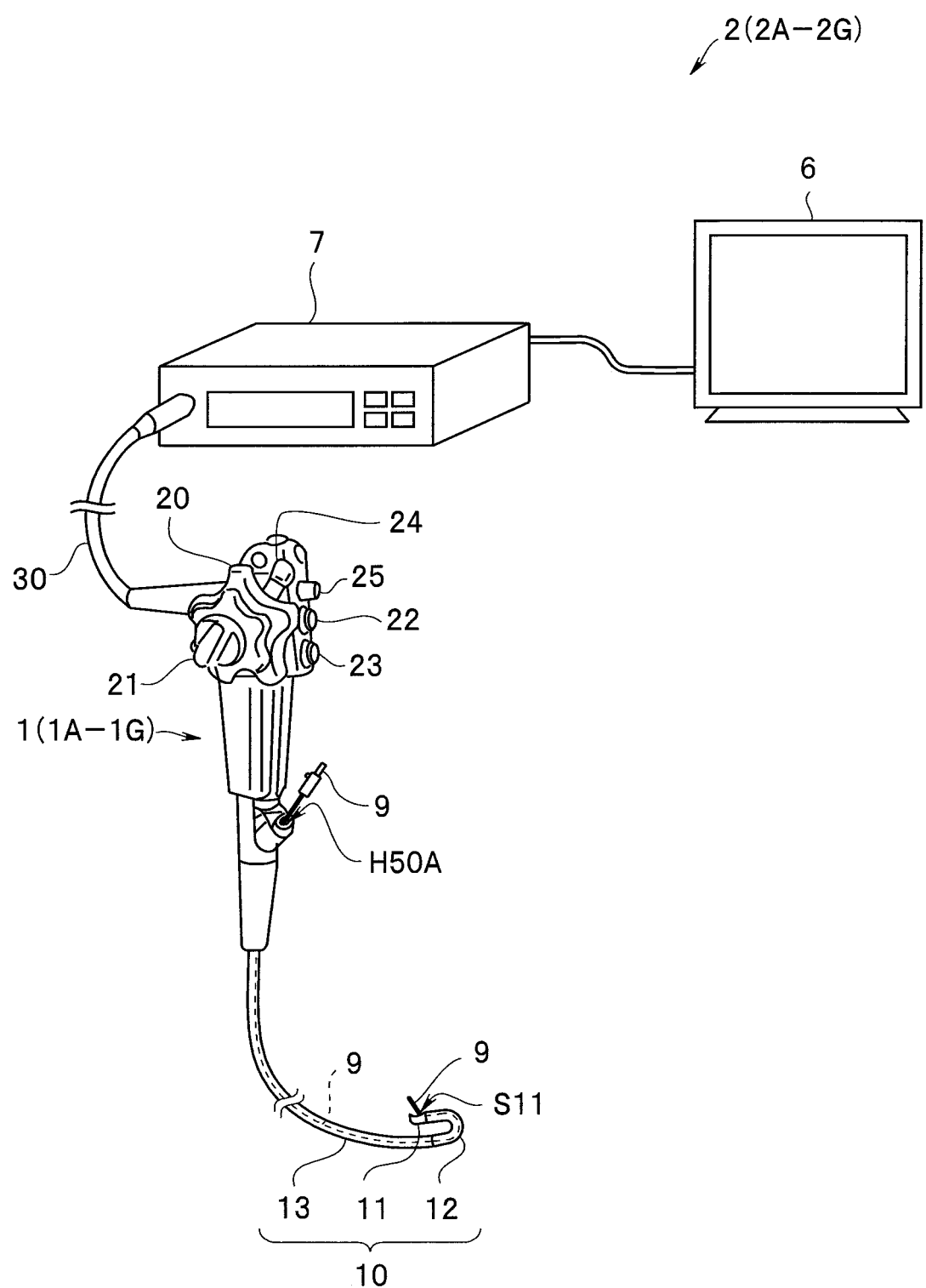
FIG. 1 is a perspective view of an endoscope system of an embodiment.

An endoscope 1 of the present embodiment shown in FIG. 1 forms an endoscope system 2, together with a treatment instrument 9, a monitor 6, and a processor 7 that is an external device. For example, the endoscope 1 is a side-view duodenoscope that is used in treatment for removing stones in the common bile duct.

Note that drawings based on embodiments are schematic. Relationships between thickness and width of each part in the drawings, ratios of thicknesses of parts and the like are different from actual relationships, actual ratios and the like. Relationships or ratios of dimensions of parts may be different among the drawings. Illustration and assignment of reference signs are omitted in relation to some structural elements.

The endoscope 1 includes an insertion section 10 that is inserted into a subject, an operation section 20 provided on a proximal end side of the insertion section 10, and a universal cord 30 extending from the operation section 20.

The insertion section 10 includes a distal end portion 11, a bending portion 12, and a flexible tube 13 that are continuously provided, the distal end portion 11 being disposed at a distal end, the bending portion 12 being disposed on a proximal end side of the distal end portion 11, the flexible tube 13 connecting a proximal end side of the bending portion 12 and the operation section 20.

The operation section 20 is provided with a bending operation dial 21, a gas feeding/liquid feeding button 22, a suction button 23, a raising base operation lever 24, and a plurality of operation switches 25. The bending portion 12 bends according to rotation of the bending operation dial 21. The operation switches 25 are electronic switches configured to operate an image pickup unit 40 (FIG. 2) and the like.

The operation section 20 is provided with an insertion opening H50A for introducing the treatment instrument 9 into the insertion section 10. A proximal end side of a treatment instrument channel 50 (or channel) (FIG. 3) is connected to the insertion opening H50A. A recess S11 in the distal end portion 11 of the insertion section 10 communicates with the treatment instrument channel 50. The distal end portion 11 includes the recess S11. The channel 50 is disposed in the insertion section 10, the channel 50 communicates with the recess S11 and the channel 50 is configured to receive the treatment instrument 9.

A raising base operation wire (not shown) is inserted in the insertion section 10. The raising base operation wire moves forward and backward according to operation of the raising base operation lever 24.

The processor 7 including a CPU processes an image pickup signal outputted from the image pickup unit 40, and transmits an image signal to the monitor 6. The monitor 6 displays an endoscopic image. The processor 7 includes a light source circuit, described later, configured to generate illumination light and the like. The light source circuit may be included in a light source unit separate from the processor 7.

The treatment instrument 9 is inserted into the treatment instrument channel 50 from the insertion opening H50A of the endoscope 1, and a distal end of the treatment instrument 9 protrudes from the recess S11.

<Configuration of Distal End Portion>

Figure 2:
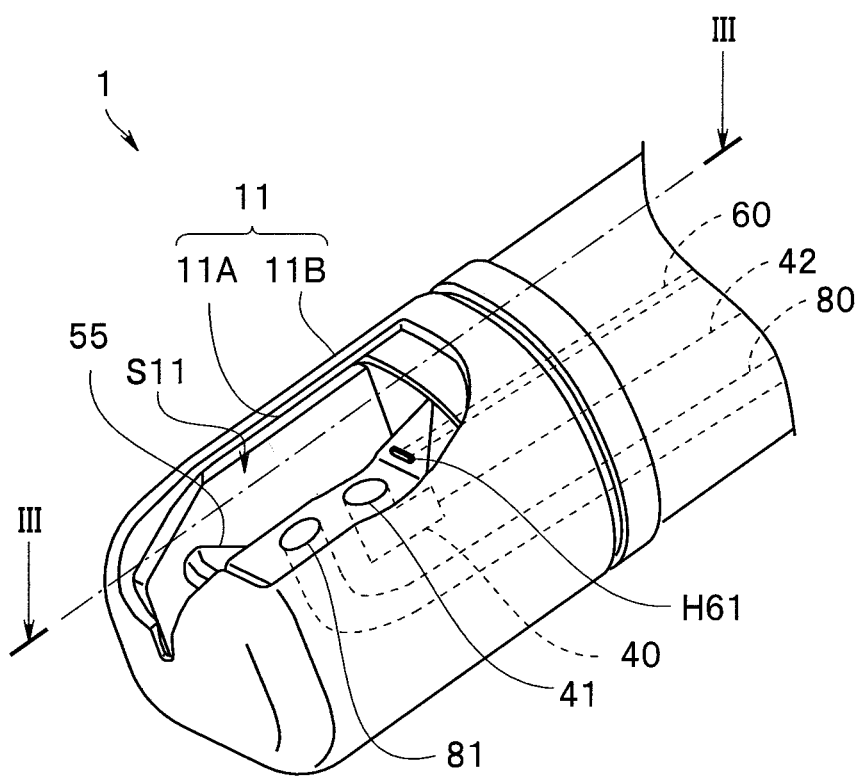
FIG. 2 is a perspective view of a distal end portion of an endoscope of a first embodiment.
Figure 3:
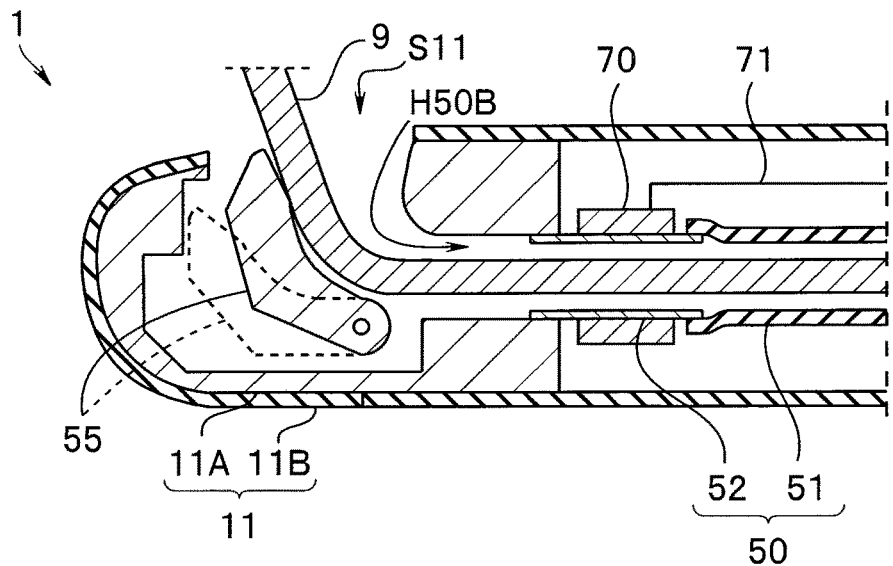
FIG. 3 is a cross-sectional view taken along in FIG. 2.

As shown in FIGS. 2 and 3, a distal end forming member 11A that is a main member of the distal end portion 11 of the endoscope 1 is a rigid member made of metal such as stainless steel or plastic such as polysulfone. The distal end forming member 11A is partially covered with a distal end cover 11B. The distal end forming member 11A includes the recess S11 where a treatment instrument raising base 55 (hereinafter referred to as "raising base") is housed. The recess S11 is a space between a pair of arm portions, of the distal end forming member 11A, protruding toward a distal end side. The raising base 55 is disposed in the recess S11, and the raising base 55 is configured to guide the treatment instrument 9 to protrude from the recess S11.

An illumination lens 81, an image pickup lens 41, and a cleaning nozzle H61 are disposed on an upper surface of the distal end forming member 11A. The illumination lens 81 emits light guided by an optical fiber 80, toward a subject. The image pickup lens 41 of the image pickup unit 40 receives a subject image. The image pickup unit 40 is driven by receiving power from the processor 7 via a cable 42. When driven, the image pickup unit 40 converts the subject image into an image pickup signal by an image pickup device such as a CCD, and transmits the signal to the processor 7. The image pickup unit 40 is configured to acquire an image, the image pickup unit 40 is disposed on the distal end portion 11, and the image pickup unit 40 is connected to and driven by an external device. The external device is configured to supply power to the sterilizing device 70.

The cleaning nozzle H61 that is a distal end opening of a liquid feeding tube 60 ejects fluid (such as water) for removing adhering substances toward the illumination lens 81 and the image pickup lens 41.

The distal end cover 11B includes an opening where the recess S11 is exposed in a state where the distal end cover 11B is attached to the distal end forming member 11A. The illumination lens 81, the image pickup lens 41, and the cleaning nozzle H61 are also exposed from the opening in the distal end cover 11B.

As shown in FIG. 3, a channel pipe 52 is connected to the distal end forming member 11A. The channel pipe 52 is a highly thermally conductive member made of metal such as stainless steel. The treatment instrument channel 50 includes the channel pipe 52 and a channel tube 51. The channel tube 51 is joined to the channel pipe 52. The channel pipe 52 is a part that connects the distal end forming member 11A and the channel. The channel tube 51 is made of flexible fluororesin or the like.

The raising base 55 is a lingulate member. The recess S11 in the distal end portion 11 includes a distal end opening H50B of the treatment instrument channel 50, in a wall surface on a proximal end side of the raising base 55. The treatment instrument 9, such as forceps, is inserted into the treatment instrument channel 50 (51, 52) from the insertion opening H50A to protrude from the recess S11 through the treatment instrument channel 50.

A protruding direction of the treatment instrument 9 protruding from the recess S11 is operated by the raising base 55. The raising base 55 is connected to a distal end of the raising base operation wire. The raising base 55 changes from a lowered state to a raised state by rotating according to backward movement of the raising base operation wire. The protruding direction (a protruding angle) of the treatment instrument 9 is adjusted according to a rising angle of the raising base 55.

The endoscope 1 is a single-use endoscope. There is no concern of bacteria getting attached to the single-use endoscope 1 before a sterile package containing the endoscope 1 is opened. However, there is a risk of the endoscope 1 coming into contact with environmental germs or germs inside a patient after being taken out of the sterile package. Furthermore, even in a case where the treatment instrument 9 is a single-use instrument, there is a risk of the treatment instrument 9 coming into contact with germs after being taken out of a sterile package.

As shown in FIG. 3, the endoscope 1 includes a first output member configured to output energy for sterilizing the treatment instrument channel 50. In other words, the endoscope 1 includes, as the first output member, a heater 70 (or sterilizing device) configured to apply heat energy to the treatment instrument channel 50. The heater 70 is the first output member that is configured to output heat energy for sterilizing the treatment instrument channel 50. The sterilizing device 70 is disposed in the distal end portion 11. The sterilizing device 70 is configured to sterilize one or more of the channel 50 and the recess S11 and the raising base 55. The parameters to effect sterilization—temperature, time of application—can vary, but include those used to meet the standards set by various countries and/or organizations for the endoscope to be used as a medical instrument. The sterilizing device 70 is arranged at a distal end side of the channel 50. When the image pickup unit 40 is driven by the external device, the sterilizing device 70 operates to sterilize the one or more of the channel 50 and the recess S11 and the raising base 55.

For example, the heater 70 is a ceramic heater such as a PTC heater, or a heat generation body including a resistance wire pattern, a nichrome wire or the like disposed on a base. The heater 70 that is flexible is wound around an outer circumference of the channel pipe 52. The heater 70 that is inflexible is formed into a substantially ring shape having an opening at a center, and is disposed on the outer circumference of the channel pipe 52, for example.

The heater 70 is disposed on the channel pipe 52 that is a connection part between the treatment instrument channel 50 and the distal end portion 11. Thermal conductivity of the channel pipe 52 that is made of metal such as stainless steel is higher than thermal conductivity of the channel tube 51 made of fluororesin or the like. The heater 70 is capable of efficiently sterilizing the treatment instrument 9 inserted in the channel pipe 52.

Two electrical leads 71 of the heater 70 are provided extending to the processor 7, and the heater 70 generates heat by power supplied by the processor 7. A temperature of the heater 70 is controlled to be higher than 60° C. and lower than 90° C. In such a temperature range, the treatment instrument 9 may be sterilized at the time of insertion of the treatment instrument 9 through the channel pipe 52, even if germs are attached to the treatment instrument 9.

With the endoscope 1 and the endoscope system 2, when driving of the image pickup unit 40 is started by operation of the operation switch 25 by a user, the first output member outputs energy for sterilization. When the endoscope 1 is connected to the processor 7 and power is supplied to the image pickup unit 40, power is simultaneously supplied to the heater 70, and the heater 70 generates heat. In other words, according to an operation method of the endoscope system 2, when the endoscope 1 is connected and the image pickup unit 40 and a built-in light source are driven, the processor 7 that is an external device supplies power to the image pickup unit 40 and the like, and at the same time, supplies power to the heater 70 that is the first output member.

Note that the first output member may start output of energy for sterilization not only when driving of the image pickup unit 40 is started by operation of the operation switch 25 by a user, but also after a predetermined time period (such as three seconds) with start of driving of the image pickup unit 40 as a trigger. In other words, supply of power to the first output member is started with supply of power to the image pickup unit 40 as a trigger.

In other words, the heater 70 generates heat even before the insertion section 10 of the endoscope 1 is inserted into a body. Note that supply of power to the heater 70 may be ended by operation of the operation switch 25 by the user when a distal end portion of the treatment instrument 9 reaches a biliary tract. When a first treatment instrument that is used is removed and a second treatment instrument is inserted into the treatment instrument channel 50, power is supplied again to the heater 70 by operation of the operation switch 25 by the user to sterilize the second treatment instrument.

With the endoscope 1 and the endoscope system 2, germs attached to the treatment instrument channel 50 can be killed after the endoscope 1 and the treatment instrument 9 are taken out of a sterile package. Furthermore, with the endoscope 1 and the endoscope system 2, the treatment instrument 9 inserted through the treatment instrument channel 50 may be sterilized before being inserted into a sterile organ such as the biliary tract.

In the following, modifications of the embodiment and other embodiments will be described.

The modifications and other embodiments are similar to the endoscope 1 and the endoscope system 2 of the first embodiment, and achieve same effects. Accordingly, in the following, structural elements having the same functions as structural elements of the endoscope 1 and the endoscope system 2 of the first embodiment will be denoted by same reference signs, and redundant description will be omitted.

First Modification of First Embodiment

Figure 4:
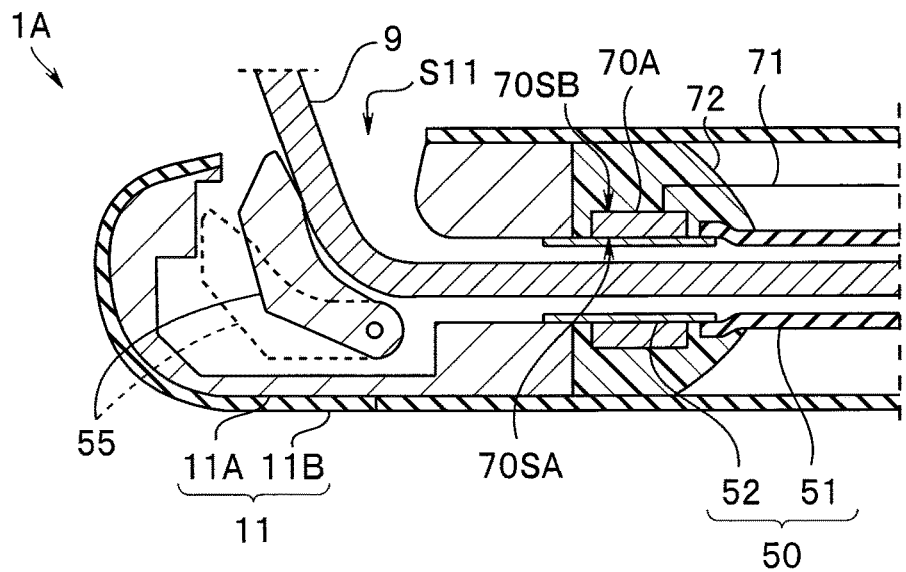
FIG. 4 is a cross-sectional view of a distal end portion of an endoscope of a first modification of the first embodiment.

An endoscope 1A of a first modification of the first embodiment shown in FIG. 4 includes a Peltier device 70A as the first output member. The Peltier device 70A includes a heating surface 70SA configured to heat the treatment instrument channel 50 (the channel pipe 52), and a cooling surface 70SB on an opposite side of the heating surface 70SA. Moreover, highly thermally conductive resin 72 is disposed between the heating surface 70SA and the channel pipe 52, and between the cooling surface 70SB and the distal end portion 11.

Thermal conductivity of general resin is less than 0.5 W/mK, for example, but thermal conductivity of the highly thermally conductive resin 72 including a filler with high thermal conductivity is greater than 1 W/mK, or greater than 5 W/mK. The thermal conductivity is measured according to ASTM D5470-1.

The endoscope 1A may cool the image pickup unit 40 at the same time as heating the treatment instrument channel 50, and thus, thermal noise in a picked-up image may be reduced.

Second Modification of First Embodiment

Figure 5:
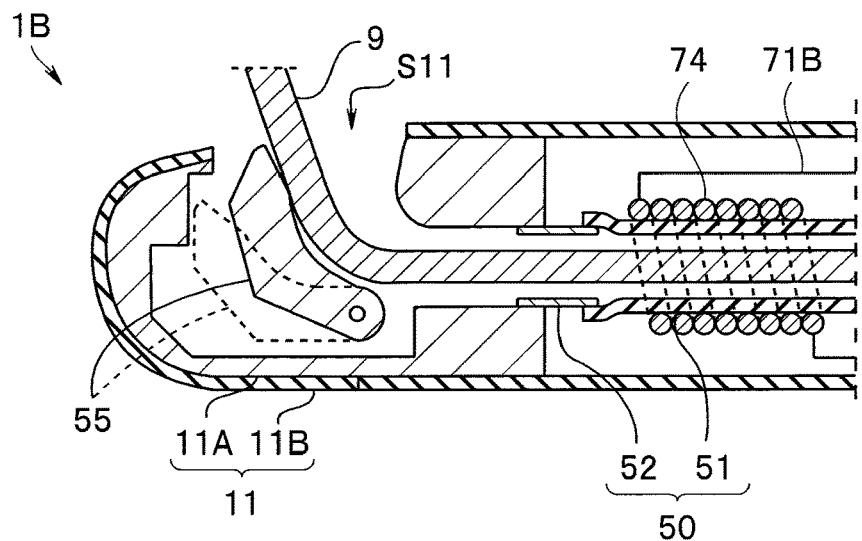
FIG. 5 is a cross-sectional view of a distal end portion of an endoscope of a second modification of the first embodiment.

An endoscope 1B of a second modification of the first embodiment shown in FIG. 5 includes, as the first output member, a metal coil 74 formed by a nichrome wire or the like wound around an outer circumference of the treatment instrument channel 50. The metal coil 74 generates heat by power supplied by the processor 7 via electrical leads 71B on both ends.

The metal coil 74 is disposed on a distal end side of the channel tube 51, but may instead be disposed along an entire length of the channel tube 51. The metal coil 74 may be disposed only on the channel pipe 52, or may be disposed across the channel pipe 52 and the channel tube 51.

Third Modification of First Embodiment

Figure 6:
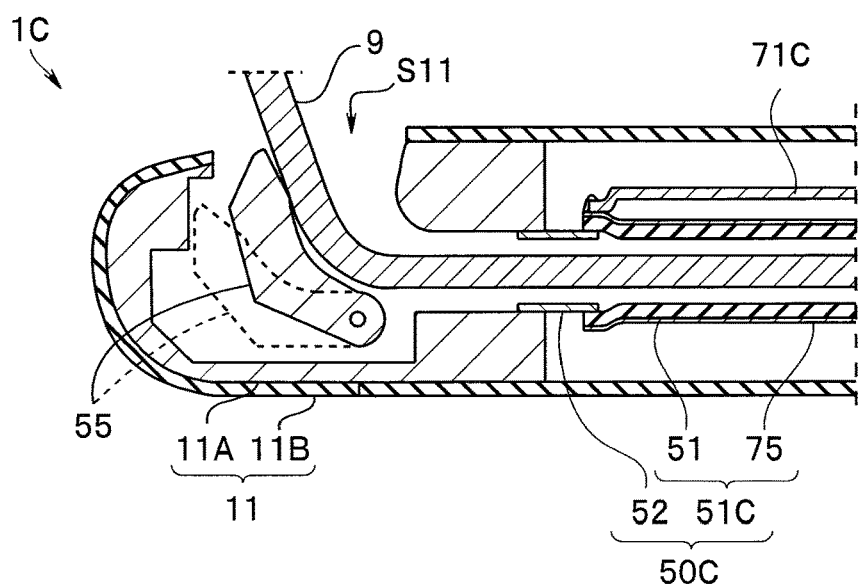
FIG. 6 is a cross-sectional view of a distal end portion of an endoscope of a third modification of the first embodiment.
Figure 7:
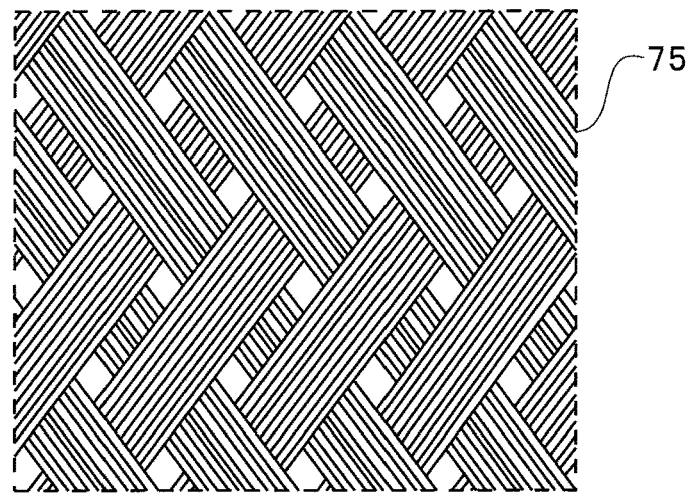
FIG. 7 is a top view of a mesh tube of the endoscope of the third modification of the first embodiment.

With an endoscope 1C of a third modification of the first embodiment shown in FIG. 6, a channel tube 51C includes a mesh tube 75 (or conductive mesh tube) on an outer circumferential surface of the channel tube 51 that is flexible. As shown in FIG. 7, the mesh tube 75 is formed by braiding thin metal wires that are conductors. The heater 70 includes the conductive mesh tube 75 disposed on an inside of the channel 50.

The channel tube 51C including the mesh tube 75 is widely used to secure mechanical strength. The endoscope 1C includes two electrical leads 71C that are electrically connected to the mesh tube 75. In other words, the electrical lead 71C is connected to each of a distal end side and a proximal end side of the mesh tube 75, and a drive current is applied to the electrical leads 71C. When the drive current is applied, the mesh tube 75 positioned between the two electrical leads 71C generates heat and thus functions as the first output member. To efficiently generate heat, the mesh tube 75 may be formed of metal with high electrical resistance, such as stainless steel.

Because the mesh tube 75 is used as the first output member, the endoscope 1C has a simpler structure than the endoscope 1 and the like. Furthermore, because the channel tube 51C can be heated along the entire length, the treatment instrument 9 inserted in the channel tube 51C may be efficiently sterilized. Note that even in a case where the mesh tube 75 is provided along the entire length of the channel tube 51C, the two electrical leads 71C may both be connected to the mesh tube 75, at two positions on the distal end side, such that only the mesh tube 75 on the distal end side of the bending portion 12 generates heat, for example.

Note that the endoscope of the embodiment may include a plurality of first output members selected from the heater 70, the Peltier device 70A, the metal coil 74, and the mesh tube 75.

Second Embodiment

Figure 8:
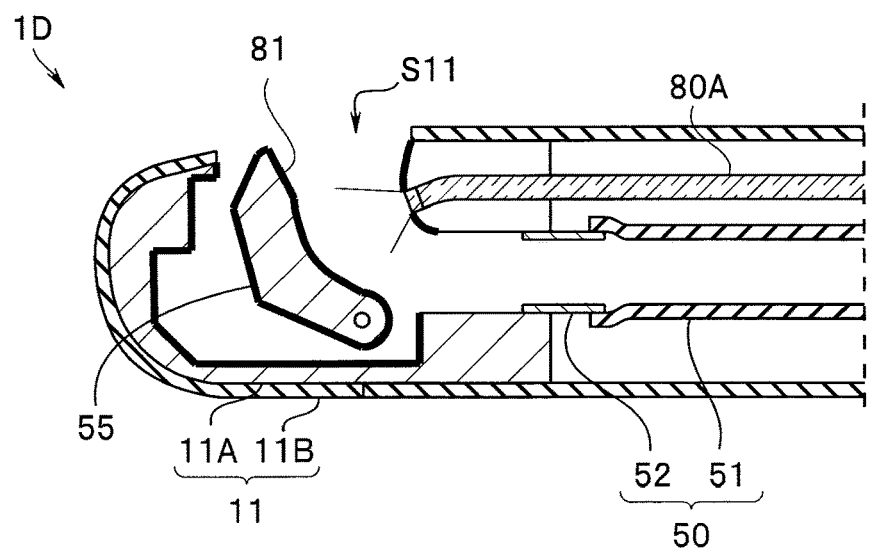
FIG. 8 is a cross-sectional view of a distal end portion of an endoscope of a second embodiment.
Figure 9:
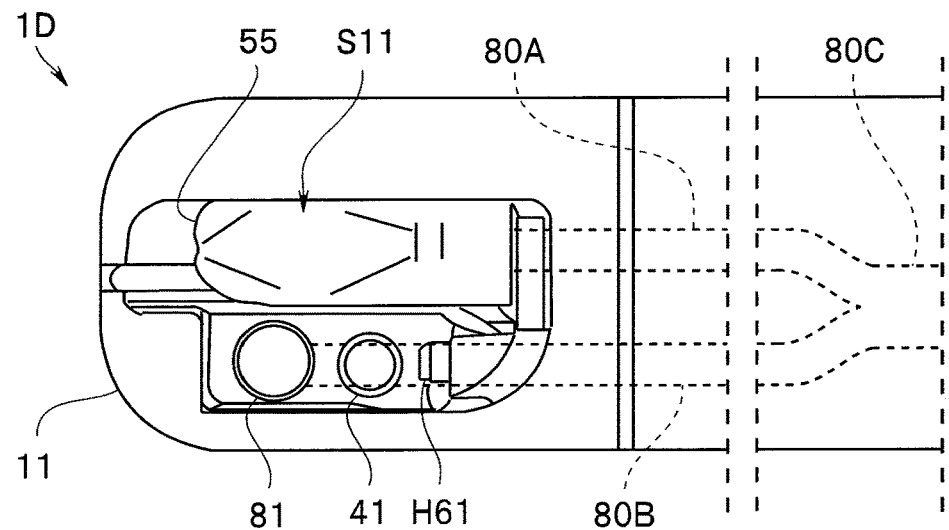
FIG. 9 is a top view of the distal end portion of the endoscope of the second embodiment.

An endoscope 1D of a second embodiment shown in FIGS. 8 and 9 includes a second output member configured to output light energy for sterilizing inside of the recess S11 in the distal end portion 11. The second output member of the endoscope 1D is a first optical fiber 80A (or sterilizing device) configured to radiate light inside the recess S11. The sterilizing device 80A is disposed in the distal end portion 11. The sterilizing device 80A is configured to sterilize one or more of the channel 50 and the recess S11 and the raising base 55. The parameters to effect sterilization—temperature, wavelength of light, time of application—can vary, but include those used to meet the standards set by various countries and/or organizations for the endoscope to be used as a medical instrument. The sterilizing device 70 is arranged at a distal end side of the channel 50. When the image pickup unit 40 is driven by the external device, the sterilizing device 80A operates to sterilize the one or more of the channel 50 and the recess S11 and the raising base 55. The external device is configured to supply power to the sterilizing device 70.

Members on the inside of the recess S11, that is, an inner wall, the raising base 55 and the like, are coated with a photocatalytic film 81 (or photocatalytic material) including titanium oxide or the like. When irradiated with light, oxidation-reduction reaction occurs on a surface of the photocatalytic film 81, and germs attached inside the recess S11 are decomposed.

For example, indigenous bacteria of an oral cavity of a subject and environmental germs may be attached to an inner surface of the recess S11 in the distal end portion 11 inserted in a duodenum through the oral cavity, and on members housed in the recess S11, such as the raising base 55. The endoscope 1D is capable of killing germs attached to the recess S11. Accordingly, germs are not attached to the treatment instrument 9 inserted in the recess S11. Note that when the treatment instrument 9 is coated with the photocatalytic film 81, germs attached to the treatment instrument 9 are also killed by the light guided by the first optical fiber 80A.

Specifically, the photocatalytic film 81 used on the endoscope 1D is a film that is obtained by doping titanium oxide with nitrogen or the like or by ion-implanting a dissimilar metal, and that acts by visible light. The surfaces of the recess S11 are coated with the photocatalytic material 81. The photocatalytic material 81 may be formed by vapor deposition or other means.

Note that the endoscope 1D includes a second optical fiber 80B configured to guide illumination light for illuminating the subject. In other words, the endoscope 1D includes the first optical fiber 80A configured to guide light for sterilization treatment, in addition to the second optical fiber 80B configured to guide the illumination light. The first optical fiber 80A and the second optical fiber 80B both include a plurality of optical fibers, and the two form one fiber bundle 80C on a proximal end side. The fiber bundle 80C is housed in a fiber tube, for example, and is inserted through a flexible tube and a universal cable to be optically connected to a light source device of the processor 7. The optical fiber 80B is a fiber optic bundle.

First Modification of Second Embodiment

Figure 10:
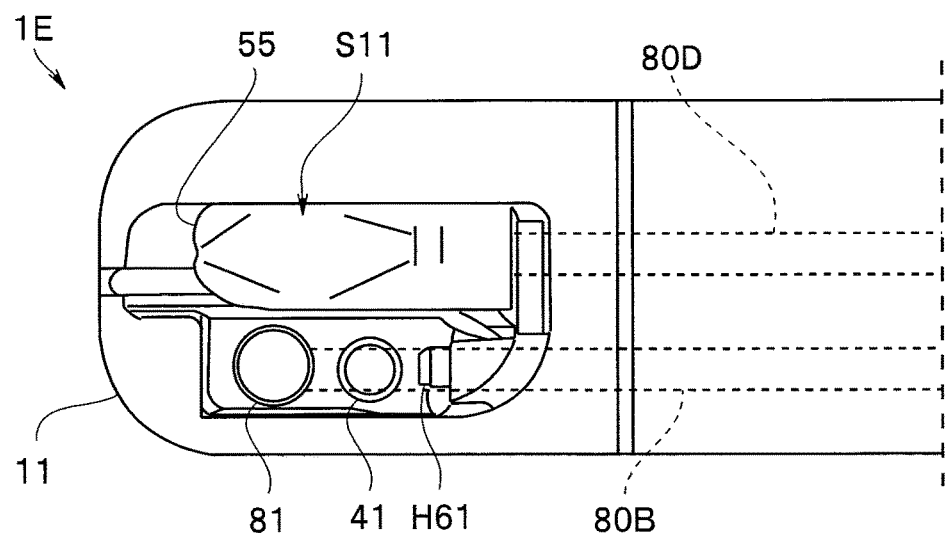
FIG. 10 is a top view of a distal end portion of an endoscope of a modification of the second embodiment.

With an endoscope 1E of a first modification of the second embodiment shown in FIG. 10, a second optical fiber 80D configured to radiate light inside the recess S11 guides ultraviolet light that is generated by an ultraviolet light source of the processor 7.

With the endoscope 1E, germs attached to the recess S11 may be killed by ultraviolet rays. Accordingly, germs do not get attached to the treatment instrument 9 inserted inside the recess S11. Furthermore, germs attached to the treatment instrument may be killed by the ultraviolet rays.

Note that it goes without saying that, also with the endoscope 1E, members inside the recess S11 may be coated with the photocatalytic film 81. The surfaces of the recess S11 are coated with the photocatalytic material 81. The photocatalytic material 81 may be formed by vapor deposition or other means.

Third Embodiment

Figure 11:
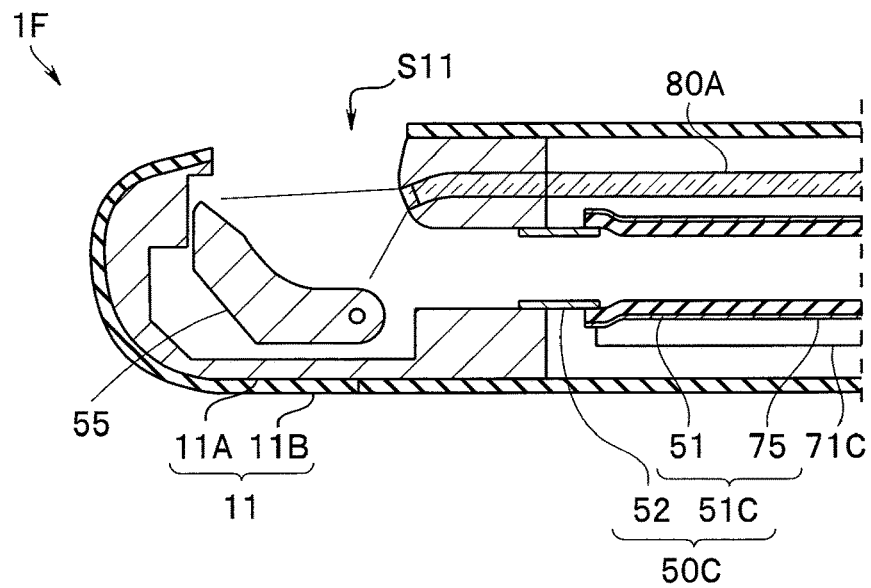
FIG. 11 is a cross-sectional view of a distal end portion of an endoscope of a third embodiment.

An endoscope 1F of a third embodiment shown in FIG. 11 includes the first output member configured to output first energy (heat) for sterilizing a treatment instrument channel 50 C, and the second output member configured to output second energy (light) for sterilizing the recess S11 in the distal end portion 11. The first output member is the mesh tube 75 that is a heater configured to apply heat to the treatment instrument channel 50C, and the second output member is the first optical fiber 80A configured to radiate light inside the recess S11.

Because members inside the recess S11 are coated with the photocatalytic film that acts by visible light, the first optical fiber 80A guides visible light that is the same as the illumination light. The surfaces of the recess S11 are coated with the photocatalytic material 81. The photocatalytic material 81 may be formed by vapor deposition or other means.

The endoscope 1F includes the first output member and the second output member, and may thus efficiently perform sterilization.

The endoscope 1F may include a plurality of first output members configured to output heat energy, selected from the heater 70, the Peltier device 70A, the metal coil 74, and the mesh tube 75. Furthermore, the second output member may be the optical fiber 80D configured to guide ultraviolet light.

Modification of Third Embodiment

Figure 12:
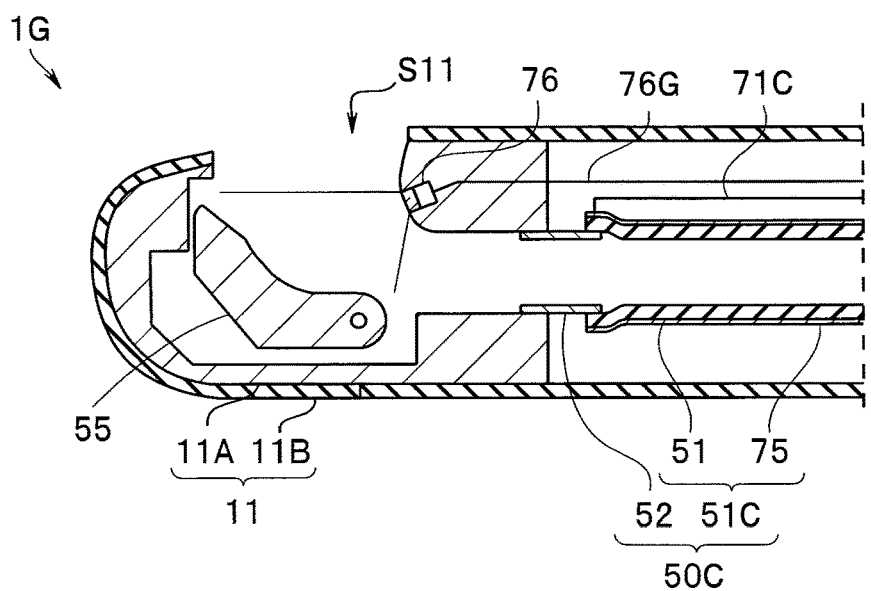
FIG. 12 is a cross-sectional view of a distal end portion of an endoscope of a modification of the third embodiment.

With an endoscope 1G of a modification of the third embodiment shown in FIG. 12, the second output member is a light emitting element 76 configured to radiate light inside the recess S11. The light emitting element 76 receives power from the processor 7 via an electrical lead 76G, and irradiates the inside of the recess S11 with ultraviolet light, for example. The first optical fiber 80A or the light emitting element 76 is configured to radiate light on the recess S11, and the radiated light sterilizes the recess S11. The sterilizing device 80A includes the optical fiber 80A or a light emitting element 76 configured to radiate ultraviolet light on the recess S11, and the radiated ultraviolet light sterilizes the recess S11. The optical fiber 80A is a fiber optic bundle.

Because the endoscope 1G does not include an optical fiber for guiding light for sterilization, the insertion section 10 has a small diameter and a simple structure.

The endoscope 1 and the like are flexible scopes for medical use, but an endoscope of another embodiment may be an endoscope for industrial use, or may be a rigid endoscope including a rigid, straight tube as the insertion section.

Needless to say, endoscope systems 2A to 2G including the endoscopes 1A to 1G achieve the same effects as the endoscope system 2 and the effects of the endoscopes 1A to 1G.

The present disclosure is not limited to the embodiment explained above. Various changes, alterations, and the like are possible within a range not changing the gist of the disclosure.

Example 1. An endoscope comprising:
an insertion section including a distal end portion including a recess;
a treatment instrument channel disposed in the insertion section, the treatment instrument channel communicating with the recess, a treatment instrument being inserted through the treatment instrument channel;
a raising base housed in the recess, the raising base being configured to adjust a direction in which the treatment instrument protrudes from the recess; and
one or both of first output member and second output member, the first output member being configured to output energy for sterilizing the treatment instrument channel, the second output member being configured to output energy for sterilizing the recess in the distal end portion.

Example 2. The endoscope according to Example 1, comprising the first output member, wherein
the first output member is a heater configured to apply heat to the treatment instrument channel.

Example 3. The endoscope according to Example 2, wherein the heater is arranged at a connection part between the treatment instrument channel and the distal end portion.

Example 4. The endoscope according to Example 3, wherein
the heater is a Peltier device including a heating surface configured to heat the treatment instrument channel, and a cooling surface on an opposite side of the heating surface, and
highly thermally conductive resin is disposed between the cooling surface and the distal end portion.

Example 5. The endoscope according to Example 2, wherein the heater is a conductor coil wound around the treatment instrument channel.

Example 6. The endoscope according to Example 2, wherein the heater is a mesh tube that is a conductor disposed on the treatment instrument channel.

Example 7. The endoscope according to Example 6, comprising electrical leads electrically connected to the mesh tube.

Example 8. The endoscope according to Example 1, comprising the second output member, wherein
the second output member is a first optical fiber or a light emitting element configured to radiate light on the recess.

Example 9. The endoscope according to Example 8, wherein
the light is visible light, and
a member inside the recess is coated with a photocatalytic film.

Example 10. The endoscope according to Example 9, further comprising a second optical fiber configured to guide illumination light for illuminating a subject, wherein
the first optical fiber forms, with the second optical fiber, one fiber bundle on a proximal end side.

Example 11. The endoscope according to Example 8, wherein the light is ultraviolet light.

Example 12. The endoscope according to Example 1, comprising the first output member and the second output member, wherein
the first output member is a heater configured to apply heat to the treatment instrument channel, and the second output member is a first optical fiber or a light emitting element configured to radiate light on the recess.

Example 13. The endoscope according to Example 1, wherein
an image pickup unit is disposed on the distal end portion, the image pickup unit being configured to acquire an image by being connected to an external device and driven, and
the output member outputs the energy when the image pickup unit is driven.

Example 14. An endoscope system comprising:
an endoscope including an insertion section, a raising base, a treatment instrument channel, and one or both of a first output member and a second output member, the insertion section including a distal end portion including a recess, the raising base being housed in the recess, an image pickup unit being disposed on the distal end portion, the treatment instrument channel being disposed in the insertion section, the treatment instrument channel communicating with the recess and allowing a treatment instrument to be inserted into the recess from the treatment instrument channel, the first output member being configured to output energy for sterilizing the treatment instrument channel, the second output member being configured to output energy for sterilizing the recess in the distal end portion; and
an external device configured to supply power to one or both of the first output member and the second output member.

Example 15. The endoscope system according to Example 14, wherein
the endoscope includes the first output member, and
the first output member is a heater configured to apply heat to the treatment instrument channel.

Example 16. The endoscope system according to Example 14, wherein
the endoscope includes the second output member, and
the second output member is an optical fiber or a light emitting element configured to radiate light on the recess.

Example 17. The endoscope system according to Example 14, wherein
the endoscope includes the first output member and the second output member, and
the first output member is a heater configured to apply heat to the treatment instrument channel, and the second output member is a first optical fiber or a light emitting element configured to radiate light on the recess.

Example 18. An operation method of an endoscope system, wherein the endoscope system includes
an endoscope including an insertion section, a raising base, a treatment instrument channel, and one or both of a first output member and a second output member, the insertion section including a distal end portion including a recess, the raising base being housed in the recess, an image pickup unit being disposed on the distal end portion, the treatment instrument channel being disposed in the insertion section, the treatment instrument channel communicating with the recess and allowing a treatment instrument to be inserted into the recess from the treatment instrument channel, the first output member being configured to output energy for sterilizing the treatment instrument channel, the second output member being configured to output energy for sterilizing the recess in the distal end portion; and
an external device configured to supply power to one or both of the first output member and the second output member, the external device being configured to supply power to one or both of the first output member and the second output member with supply of power to the image pickup unit as a trigger.

Example 19. The operation method of the endoscope system according to Example 18, wherein the first output member applies heat to the treatment instrument channel, and the second output member radiates light on the recess.

Example 20. The operation method of the endoscope system according to Example 19, wherein the endoscope is a single-use endoscope.

What is claimed is:

1. An endoscope, comprising:
   an insertion section including a distal end portion, the distal end portion including a recess;
   a channel disposed in the insertion section, the channel communicating with the recess and the channel configured to receive a treatment instrument;
   a raising base disposed in the recess, the raising base configured to guide the treatment instrument to protrude from the recess; and
   a sterilizing device selected from the group consisting of an optical fiber and an ultraviolet light emitting device,
   wherein the sterilizing device is disposed in the distal end portion,
   wherein an optical axis of the sterilizing device intersects the raising base, and the optical axis intersects a longitudinal axis of the insertion section,
   wherein the sterilizing device is configured to radiate ultraviolet light on the recess and the raising base, and
   wherein the radiated ultraviolet light sterilizes the recess and the raising base.

2. The endoscope according to claim 1, further comprising a heater configured to apply heat to the channel to sterilize the channel,
   wherein the heater is provided on an outer periphery of the channel, and
   wherein a thermally conductive resin occupies a space between the heater and the distal end portion.

3. The endoscope according to claim 2, wherein the heater is arranged at a distal end side of the channel.

4. The endoscope according to claim 2, wherein the heater includes a Peltier device including:
   a heating surface having a first surface configured to heat the channel, and
   a cooling surface on an opposite side of the heating surface from the first surface, and
   wherein the thermally conductive resin is disposed between the cooling surface and the distal end portion.

5. The endoscope according to claim 2, wherein the heater includes a Peltier device positioned around the channel.

6. The endoscope according to claim 5, further comprising electrical leads electrically connected to the Peltier device.

7. The endoscope according to claim 1, wherein the optical fiber is a fiber optic bundle.

8. The endoscope according to claim 1, wherein surfaces of the recess are coated with a photocatalytic material.

9. The endoscope according to claim 1, further includes an image pickup unit including a charge coupled device, the image pickup unit configured to acquire an image,
   wherein the image pickup unit is disposed on the distal end portion,
   wherein the image pickup unit is connected to and driven by an external device, and
   wherein, when the image pickup unit is driven by the external device, the sterilizing device operates to sterilize the recess and the raising base.

10. An endoscope system, comprising:
    the endoscope according to claim 1;
    an image pickup unit including a charge coupled device being disposed on the distal end portion; and
    an external device configured to supply power to the sterilizing device.

11. The endoscope system according to claim 10, wherein the endoscope further includes:
    a heater configured to apply heat to the channel to sterilize the channel,
    wherein the heater is provided on an outer periphery of the channel, and wherein a thermally conductive resin occupies a space between the heater and the distal end portion.

12. The endoscope system according to claim 10, wherein the image pickup unit is connected to and driven by the external device, and
    wherein, when the image pickup unit is driven by the external device, the sterilizing device operates to sterilize the recess and the raising base.

13. A method of operating an endoscope system, wherein the endoscope system comprises:
    an endoscope including:
      an insertion section including a distal end portion including a recess,
      a channel disposed in the insertion section, the channel communicating with the recess and the channel configured to receive a treatment instrument,
      a raising base disposed in the recess, the raising base configured to guide the treatment instrument to protrude from the recess,
      a sterilizing device selected from the group consisting of an optical fiber and an ultraviolet light emitting device, and
      an image pickup unit including a charge coupled device disposed on the distal end portion, and
    an external device configured to supply power to the sterilizing device, wherein the image pickup unit is connected to and driven by the external device, wherein the sterilizing device is disposed in the distal end portion,
    wherein an optical axis of the sterilizing device intersects the raising base, and the optical axis intersects a longitudinal axis of the insertion section, wherein the sterilizing device is configured to radiate ultraviolet light on the recess and the raising base, and wherein the radiated ultraviolet light sterilizes sterilize one or more of the channel and the recess and the raising base, and wherein the method includes:

driving the image pickup unit by the external device; and when the image pickup unit is driven by the external device, simultaneously driving the image pickup unit by the external device and supplying power from the external device to the sterilizing device to sterilize the one or more of the channel and the recess and the raising base.

14. The method according to claim 13, wherein the endoscope further includes a heater configured to apply heat to the channel to sterilize the channel, wherein the heater is provided on an outer periphery of the channel and a thermally conductive resin occupies a space between the heater and the distal end portion, and wherein the method further comprises applying heat to the channel to sterilize the channel.

* * * * *